United States Patent [19]
Carls

[11] Patent Number: 5,522,081
[45] Date of Patent: May 28, 1996

[54] DRIVE CURRENT DETECTION AND OPTIMIZATION CIRCUIT FOR COMPUTER SYSTEMS

[75] Inventor: John M. Carls, Austin, Tex.

[73] Assignee: Dell USA, L.P., Austin, Tex.

[21] Appl. No.: 234,454

[22] Filed: Apr. 28, 1994

[51] Int. Cl.⁶ .................................. G06F 1/32; G11C 8/00
[52] U.S. Cl. ..................... 395/750; 340/662; 340/663; 326/86; 307/31; 307/116
[58] Field of Search ........................... 395/306, 550, 395/700, 750; 340/662, 663, 664; 327/538, 540, 545; 333/16; 326/86; 307/31, 116, 131, 156

[56] References Cited

U.S. PATENT DOCUMENTS 4,428,020  1/1984  Blanchard, Jr. .................... 361/90
5,030,857  7/1991  Sanwo et al. ....................... 307/475

Primary Examiner—Jack B. Harvey
Assistant Examiner—Jeffrey K. Seto
Attorney, Agent, or Firm—Henry N. Carrana; Michelle M. Turner; Mark P. Kahler

[57] ABSTRACT

In a computer system having a computer bus drive circuit capable of providing drive current to an individual line of a computer bus coupled thereto, a circuit for determining a proper level for the drive current and a method of making such determination. The circuit comprises: (1) a detection circuit, coupled to the individual line of the bus, for monitoring a response of the individual line of the bus to changes in state thereof during an operation of the computer system and providing an indication of the response and (2) a drive current establishment circuit, coupled between the detection circuit and the computer bus drive circuit, for establishing the proper level for the drive current in response to the indication produced by the detection circuit during an operation of the computer system.

50 Claims, 3 Drawing Sheets

DRIVE CURRENT DETECTION AND OPTIMIZATION CIRCUIT FOR COMPUTER SYSTEMS

TECHNICAL FIELD OF THE INVENTION

The present invention is directed, in general, to computer bus drive circuitry for computer systems and more specifically to a circuit for detecting and setting a proper drive current level for individual lines in the computer bus.

BACKGROUND OF THE INVENTION

Today's standard computer architecture calls for a number of separate components, such as a central processing unit ("CPU"), memory, ports and peripheral devices to be coupled together by electrical buses to provide a pathway for data between the various components. Electrical buses are simply sets of conductors (or "lines") designed to operate as a group.

In typical computer architectures, there are address buses, data buses, control buses and input/output ("I/O")-memory buses. Address buses are designed to transmit address data to allow selection of devices and memory locations for data transfer. Data buses carry the substantive data to be transferred. Control buses transmit control signals to allow for synchronization and priority among the various components of the computer, allowing them to work in concert. I/O-memory buses allow data to be transferred between areas of memory (as in direct memory access ("DMA")) or to and from I/O ports to external devices.

During normal operation of computer systems, an electronic component is required to supply a level of electrical current to drive the various lines of the buses, enabling them to carry the signals. In personal computers ("PCs"), this component is known as a system controller. Some system controllers are provided with the capability of driving the various bus lines at a selectable drive current level. With such controllers, a digital number representing the desired level is provided to the system controller at a point early in the initialization (or "booting") of the computer system to select a drive current level.

Components transmit data over buses by changing voltages and therefore switching the electrical current on the various lines of the bus. In binary digital computers, each line in a bus is capable of assuming one of two possible states at a given moment. These states are represented by presence or absence of a voltage, or potential difference relative to ground, on each of the lines. In some schemes, the presence of a voltage denotes a binary zero and the absence of a voltage denotes a binary one. In other schemes, the presence of a voltage denotes a change from one state to the other, while the absence of a voltage denotes no change.

During operation, each particular line may change between binary one and binary zero many millions of times a second. Individual bits in the signal thus should have relatively sharp rising and falling edges and are relatively brief in duration. It is vital to preserve the integrity and fidelity of the data transmitted over the bus. Therefore, it is important that transitions between binary one and binary zero be fast and sure. In an ideal world, the bus changes voltages instantaneously and data is transmitted reliably.

Unfortunately, in the real world, buses are real electrical conductors and therefore contain capacitance, resistance and inductance ("transmission line effects") just as do all real conductors.

Capacitance traps electrical charge within the line, presenting, in a sense, a momentum against which the change must take place. When the line is directed to change from a binary one to a binary zero (meaning a grounding of the line), it resists the change, typically causing a voltage oscillation at the point of transition (termed "ringing"). Furthermore, excess electrical energy may reflect back from impedances, causing reflections and concomitant voltage oscillations. This reflection may be of sufficient magnitude as to cause components reading data from the bus to misread the oscillation as the presence of a voltage (a binary one) instead of the intended binary zero, thereby corrupting the flow of data.

Resistance dissipates electrical energy in the conductor, reducing the efficiency of the computer bus. Increased resistance may attenuate signals on the bus to the point that data are lost in transmission, compromising data integrity.

Inductance causes crosstalk between neighboring conductors (mutual inductance) or resistance to changes in voltage on a given conductor (self inductance). Thus, signal transitions may be delayed or made noninstantaneous, further corrupting the data. Finally, capacitance, resistance and inductance can cooperate to cause harmonic sympathy on conductors in an electrical bus, resulting in spurious frequencies being created, maintained or amplified.

During design of a new computer system, it is important to ensure that buses are not susceptible to signal distortion from stray capacitance, resistance or inductance. There are accepted design rules that can be applied to minimize these ill effects. It is also important to tailor the drive current level for the various bus lines to the capacitance, resistance and inductance of the bus lines. If the drive current level is set too low, there may be an insufficient current to carry the signals during times of heavy loads, causing errors.

On the other hand, if drive current is set too high, several disadvantages result. First, the excess current can cause reflection on the bus lines, thereby distorting pulse edges and creating false signal transitions. Second, the bus reflection creates high frequency energy that, in turn, causes electromagnetic interference ("EMI"). Third, energy is wasted in excess drive current, increasing the overall power consumption of the computer system. This disadvantage is particularly realized in portable computer systems, wherein battery power is limited. However, with the advent of so-called "green PCs," energy conservation in desktop PCs is also of concern. "Misdrive" is defined as a condition in which too little or too much drive current is supplied. In the past, in PCs employing system controllers with programmable drive current levels, the drive current levels were immutably determined during design of the computer system and established with hard-wired resistors or the like in the computer system.

Todays PC's employ, in general, an open architecture wherein a plurality of expansion slots are provided within a main chassis. Each of the slots has a connector adapted to receive a peripheral (also "adapter" or "expansion") daughter board (or, interchangeably, "card") therein. The connector receives a card edge having a plurality of card edge contacts thereon. The contacts couple circuitry on the peripheral card to expansion address, data, control and I/O-memory buses on the PC. A PC user is therefore able to equip the PC to perform desired functions.

For instance, there are peripheral cards containing modems; facsimiles; disk drives or controllers; video controllers; serial, parallel or small computer systems interface ("SCSI") ports; auxiliary memory; coprocessors; sound boards; recognition boards; network boards and the like. There are many manufacturers of these and other cards, resulting in literally thousands of different card combinations and permutations that are possible to install in a single computer system. Since each of these cards couples to each of the computer system's expansion buses, the installation of a card to a system is likely to have an effect on the electrical characteristics (capacitance, resistance and inductance) of each of the conductors in the buses. The cards may electrically interact with each other in a nonobvious way to further compromise bus performance if the proper drive current level is not present.

Further, PCs are capable of receiving varying amounts of main memory. It is conventional to package random access memory ("RAM") in single in-line memory modules ("SIMMs"). Users can plug in or remove SIMMs as units, thereby providing a convenient way of upgrading the main memory capacity of a PC. Unfortunately, drive current required is also a function of main memory size.

Thus, given the open architecture and the wide variation of capacitance, inductance and resistance that the various possible configurations can create on the bus lines, it is impossible to choose a drive current level for the lines that is appropriate under all configurations. Therefore, designers have erred on the side of excess, providing a drive current level that sometimes causes undue reflection, EMI and power wastage. Some PCs determine the amount of main memory installed in the PC and set drive current as a function of the amount of main memory. Unfortunately, main memory size is not the only factor determining the proper drive current required.

What is needed in the art is a circuit within the computer system for determining and establishing the proper drive current level of the various bus lines as the computer system is operating, thereby allowing the particular complete configuration (and its resulting capacitive and inductive effects) of the computer system to be taken into account in real time. Preferably, the circuit should take the form of a closed feedback control loop.

SUMMARY OF THE INVENTION

To address the above-discussed deficiencies of the prior art, it is a primary object of the present invention to provide a circuit for detecting and setting a proper drive current level for individual lines in the computer bus. The circuit should take the form of a feedback loop, allowing dynamic changes in drive current level as a function of bus line response to changes in state.

In the attainment of the above primary object, the present invention provides, in a computer system having a computer bus drive circuit capable of providing drive current to an individual line of a computer bus coupled thereto, a circuit for determining a proper level for the drive current and a method of making such determination. The circuit comprises: (1) a detection circuit, coupled to the individual line of the bus, for monitoring a response of the individual line of the bus to changes in state thereof during an operation of the computer system and providing an indication of the response and (2) a drive current establishment circuit, coupled between the detection circuit and the computer bus drive circuit, for establishing the proper level for the drive current in response to the indication produced by the detection circuit during an operation of the computer system.

Thus, the present invention obviates the need for a priori determination of a proper drive current level by a computer designer. Rather, the computer system is adaptable in real time to changes in component configuration or utilization, tailoring drive current in a closed control loop manner to match usage and eliminating or at least drastically reducing excess drive current or a shortage in drive current.

That the drive current is adaptable yields several distinct advantages. First, reflection on the bus lines is minimized, thereby hardening pulse edges and reducing false signal transitions. Second, since the bus reflection is minimized, concomitant EMI is also minimized. Third, energy that would have been wasted in excess drive current is saved instead, thereby reducing the overall power consumption of the computer system. This advantage is particularly attractive in portable computer systems, wherein battery power is a limited resource that is best conserved.

In a preferred embodiment of the present invention, the detection circuit comprises a reflection sensing circuit for determining whether the changes in state of the individual line of the bus are of an undesired profile or shape. In a more preferred embodiment, the detection circuit comprises a reflection sensing circuit for determining whether the changes in state cause a deviation from an allowed range of voltage values. In the more preferred embodiment, a window comparator is employed to test whether voltage changes fall outside of the allowed range (in one embodiment, a range from 0 to 5 volts DC), indicating a voltage spike.

In a preferred embodiment of the present invention, the drive current establishment circuit comprises a latching circuit for storing the indication produced by the detection circuit. It is preferable to obtain a reliable indication of changes of state in the individual line. Therefore, it is most advantageous to choose a proper time for sampling the individual line when the response of the line assumes a steady state. The output of the detection circuit should preferably not be sampled and latched until this steady state has been reached. The latch circuit allows the proper time to be selected. In a more preferred embodiment, the drive current establishment circuit is capable of receiving a power-on reset ("POR") signal generated when the computer system completes a POR routine to allow the computer bus drive circuit to receive a signal representing the proper level when the computer system completes the POR routine.

In a preferred embodiment of the present invention, the drive current establishment circuit provides an initial level (probably factory-set) for the drive current when the computer system begins operation. It is preferable to start the computer system with an initial drive current level. Although the initial drive current level may not ultimately equal the proper level determined by feedback, it serves as a suitable starting point.

In a preferred embodiment of the present invention, the circuit further comprises a plurality of detection circuits and drive current establishment circuits coupled to selected other individual lines of the bus for individually monitoring and establishing the proper level for the drive current for each of the selected other individual lines. Thus, the present invention is capable of allowing closed loop feedback control of a multiple line bus to tailor separately the drive current for each of the multiple lines. In this preferred embodiment, the computer bus drive circuit is capable of providing a different level of drive current to each of the individual lines of the bus.

In one embodiment of the present invention, the detection circuit can comprise a capacitive loading detection circuit for determining a capacitive loading of the individual line.

Drive current required is a function of the capacitive loading of a line. Therefore, the scope of the present invention includes detecting the capacitive loading of the line and adjusting the drive current as a function thereof. Likewise, the detection circuit can alternatively comprise an impedance detection circuit for determining an impedance of the individual line. Drive current required is also a function of line impedance. Therefore, the present invention contemplates monitoring of line impedance or capacitive loading (both proactive indicators in that they indicate a cause of misdrive) or reflecting (a reactive indicator in that it is an effect of misdrive) to determine the most proper drive current, whichever is most feasible for a given application.

Although the present invention is not restricted to operation in any particular class of computing machinery, in a preferred embodiment of the present invention, the computer system is a PC.

The foregoing has outlined rather broadly the features and technical advantages of the present invention so that the detailed description of the invention that follows may be better understood. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
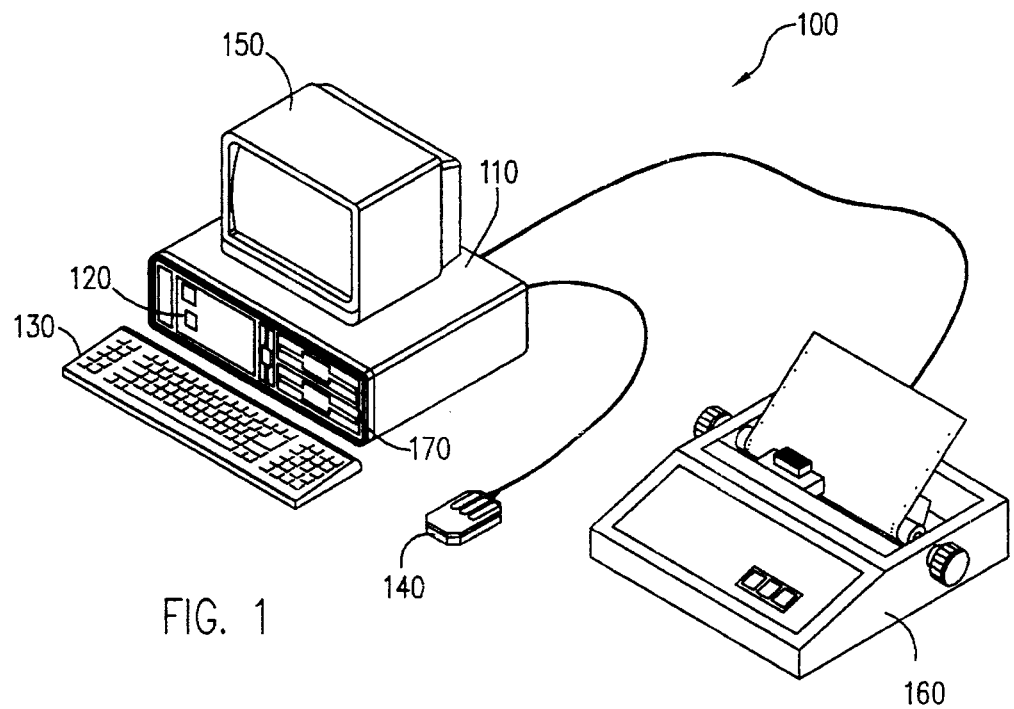
FIG. 1 illustrates an isometric view of a PC that provides an environment within which the present invention can operate.

Referring initially to FIG. 1, illustrated is a PC 100 that provides an environment within which the present invention operates. The PC 100 comprises a main chassis 110 containing computer system components to be illustrated and discussed in more detail with regard to FIG. 2. The main chassis 110 features, among other things, a reset button 120, a single pole momentary switch used to signal a CPU and other components (e.g. memory and input/output ("I/O") controllers not shown in FIG. 1) within the PC 100 to reboot, thereby providing a means of rebooting the PC 100. Coupled through individual connectors on the main chassis 110 are a keyboard 130, a mouse 140 and a video monitor 150. The peripheral devices 130, 140, 150, 160 allow the PC 100 to interact with a user. FIG. 1 also shows a disk drive 170, allowing permanent storage of computer system data on magnetic media.

Figure 2:
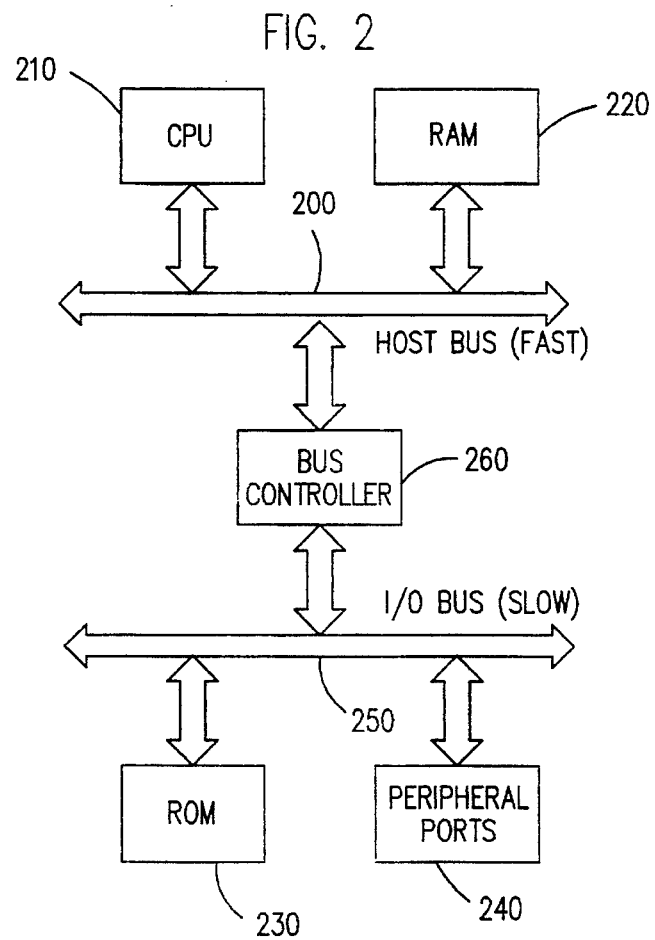
FIG. 2 illustrates a block diagram of components of the PC of FIG. 1 that provide an environment within which the present invention can operate.

Turning now to FIG. 2, illustrated is a block diagram of an architecture of the PC of FIG. 1 that serves as an environment within which the present invention can operate. Specifically, the architecture is embodied in electronic components that reside within the main chassis 110 of FIG. 1.

Shown is a host bus 200. Coupled to the host bus 200 are a microprocessor central processing unit ("CPU") 210 and random access memory ("RAM") 220. An I/O bus 250 is coupled to read-only memory ("ROM") 23 and peripheral ports 240. The peripheral ports 240 couple the I/O bus 250 to the peripheral devices 130, 140, 150, 160, 170 of FIG. 1 for communication therewith. Included among the peripheral ports 240 is a parallel port. Finally, a bus controller 260 couples the host bus 200 and the I/O bus 250 to provide a path for and manage communication therebetween. The host bus 200 is relatively fast to facilitate rapid communication between the CPU 210 and the RAM 220 and is burdened with as few components as possible to maximize its speed. The I/O bus 250 is allowed to run at a slower pace because its speed is less critical. Each of the lines of the buses 200, 250 require a drive current to carry signals thereon. Accordingly, the present invention operates in conjunction with a system controller that supplies the required drive current. Of course, the present invention can also function within an architecture that only has a single bus.

Figure 3:
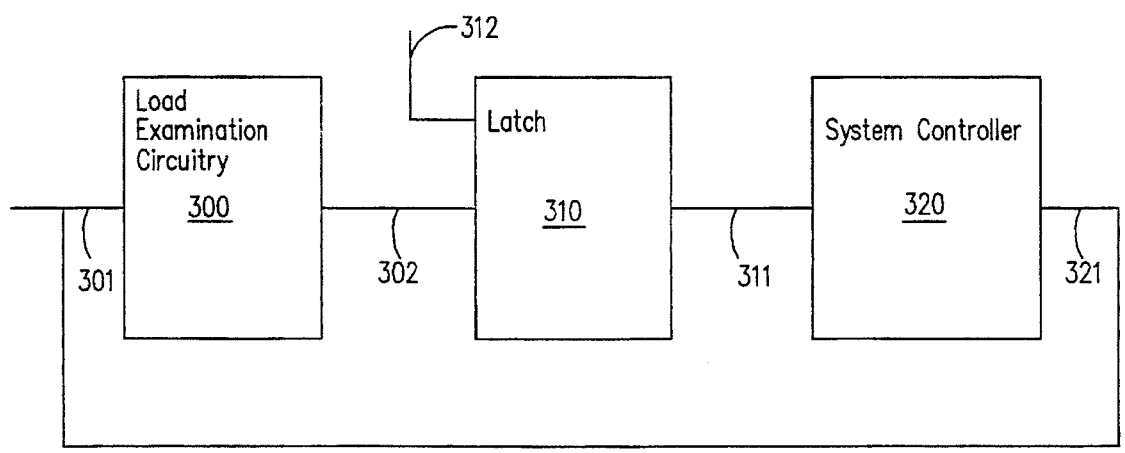
FIG. 3 illustrates a block diagram of a drive current level determination circuit according to the present invention.

Turning now to FIG. 3, illustrated is a block diagram of a drive current level determination circuit according to the present invention.

The determination circuit comprises a detection circuit 300 (titled "load examination circuitry" in FIG. 3), coupled to selected individual lines of a bus 301, that may be lines of the buses 200, 250 of FIG. 2. The detection circuit 300 monitors a response of the selected individual lines of the bus 301 to changes in state thereof during a sample period occurring at a specific time (to be described in conjunction with FIG. 4) during operation of the PC 100. The determination circuit 300 provides an indication of the response to a latch circuit 310 via lines 302. The latch circuit 310 temporarily stores or "holds" the indication of the response until an appropriate time (also to be described in conjunction with FIG. 4). A drive current establishment circuit (a part of a system controller 320 and including the latch circuit 310) is coupled between the detection circuit 300 and the computer bus drive circuit (another part of the system controller 320) and establishes the proper level for the drive current in response to the indication produced by the detection circuit 300 during operation of the PC 100.

Thus, the drive current is adaptable in real time to changes in component configuration or utilization, tailoring drive current in a closed control loop manner to match usage and eliminating or at least drastically reducing excess drive current or a shortage in drive current.

As previously described, in a preferred embodiment of the present invention, the detection circuit 300 comprises a reflection sensing circuit for determining whether the changes in state of the individual lines of the bus are of an undesired profile or shape. In a more preferred embodiment, the detection circuit comprises a reflection sensing circuit for determining whether the changes in state cause a deviation from an allowed range of voltage values. In the illustrated embodiment, a window comparator is employed to test whether voltage changes fall outside of the allowed range (in one embodiment, a range from 0 to +5 volts DC), indicating a voltage spike. To enable this embodiment, an industry-standard window comparator is configured with 0 and +5 volt DC limits in a conventional manner for each individual bus line to be monitored. Each individual bus line to be monitored is coupled to the corresponding window comparator. If the voltage of a bus line falls below 0 volts or rises above +5 volts at any time, no matter how briefly, during the sample period, an output of the corresponding window comparator goes high, indicating that a reflection has taken place on the individual bus line during the sample period. If the output of the window comparator remains low following the sample period, then there is an indication that no reflection has taken place.

At the end of the sample period, the output of the window comparator is latched and held in the latch circuit 310. The latch circuit latches the output of the window comparator when an input signal goes low on a line 312. This input signal goes low under conditions to be described with respect to FIG. 4.

Figure 4:
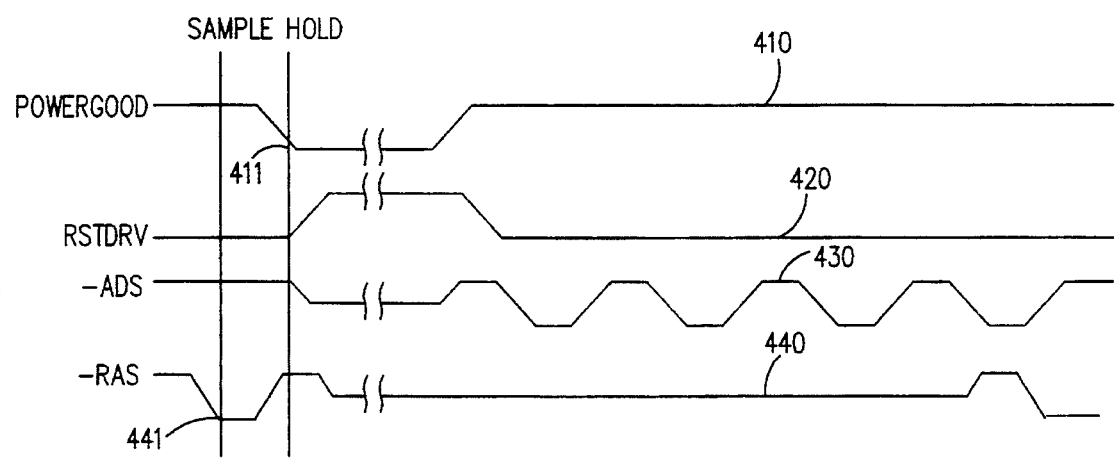
FIG. 4 illustrates a timing diagram for establishing a sample and hold period for a detection circuit that forms a part of the drive current level determination circuit of FIG. 3.

Turning now to FIG. 4, illustrated is a timing diagram for establishing a sample and hold period for a detection circuit that forms a part of the drive current level determination circuit of FIG. 3. It is preferable to obtain a reliable indication of changes of state in the individual line. Therefore, it is most advantageous to choose a proper time for sampling the individual line when the response of the line assumes a steady state. The output of the detection circuit should preferably not be sampled and latched until this steady state has been reached. The latch circuit allows the proper time to be selected via the line 312.

FIG. 4 shows conditions of well-known signals in a PC that may be used to trigger the sample and hold periods. A Powergood signal 410 conventionally causes all state machines within the PC 100 to be reset. The Powergood signal 410 is created by the power supply of the PC 100 and goes high when the power supply determines its power output has reached a steady, acceptable state. A RstDrv signal 420 actually governs the resetting of the state machines within the PC 100. The RstDrv signal 420 is also referred to as a power-on reset ("POR") signal and is generated when the computer system completes a POR routine. An ADS signal 430 activates by strobing when the RstDrv signal 420 goes low. The ADS signal 430 strobes to provide address select synchronization. Finally a RAS signal 440 strobes at a slower rate than the ADS signal, providing row address synchronization. Those of skill in the art will understand the identity and function of these signals 410, 420, 430, 440. By experimentation, it has been determined that a suitable time to start the sample period is upon completion of the fourth high-low transition of the RAS signal. By this time, the individual lines have reached a steady state, and measurements of reflections are accurate.

It has also been determined that the sample period should end when the Powergood signal 410 goes low. When the Powergood signal goes low, the latch circuit 310 latches the output of each window comparator. When the RstDrv signal 410 goes high again, the system controller 320 is designed to read the contents of the latch circuit 310. This enables the system controller 320 to set drive levels.

In the illustrated embodiment, the system controller 320 is a commercially-available VL82C486, manufactured by VLSI Technology, Inc.. The VL82C486 reads the contents of the latch circuit 310 via PPICS and BLKA20 pins thereof and sets two bits in a RAMSET register therein. A 00 value in the two bits indicates a RAM current drive level of 12 milliamps. A 01 value in the two bits indicates a RAM current drive level of 24 milliamps. A 10 value in the two bits indicates a RAM current drive level of 36 milliamps. Finally, a 11 value in the two bits indicates a RAM current drive level of 48 milliamps.

The VL82C486 also reads the contents of the latch circuit 310 via an FMPRG pin thereof and sets a bits in a BUSCTL register therein. A 0 value in the bit indicates a slot current drive level of 12 milliamps. A 1 value in the bit indicates a slot current drive level of 24 milliamps.

Figure 5:
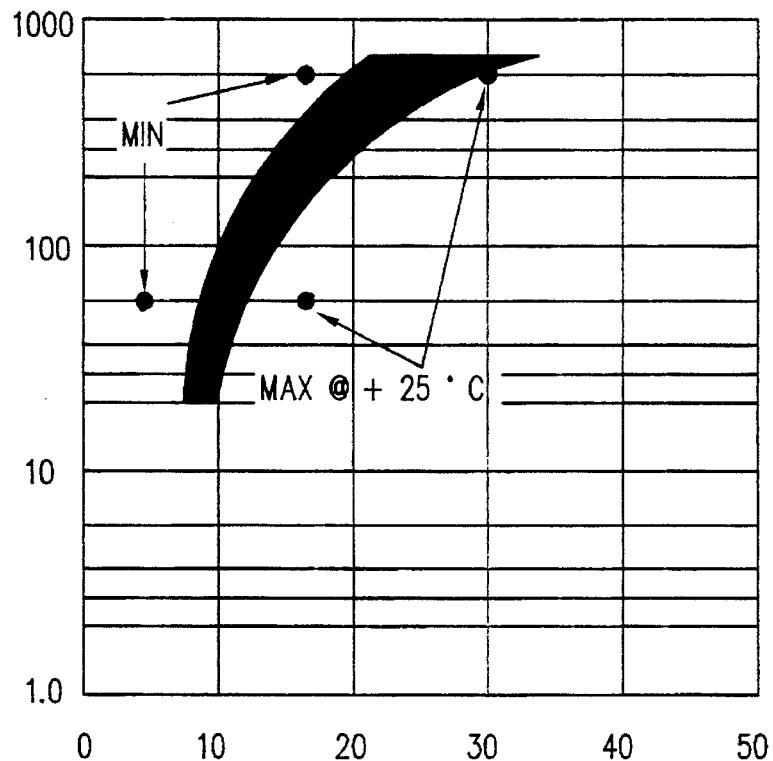
FIG. 5 illustrates a graph of proper times to transition from a low state to a high state as a function of line capacitance.
Figure 6:
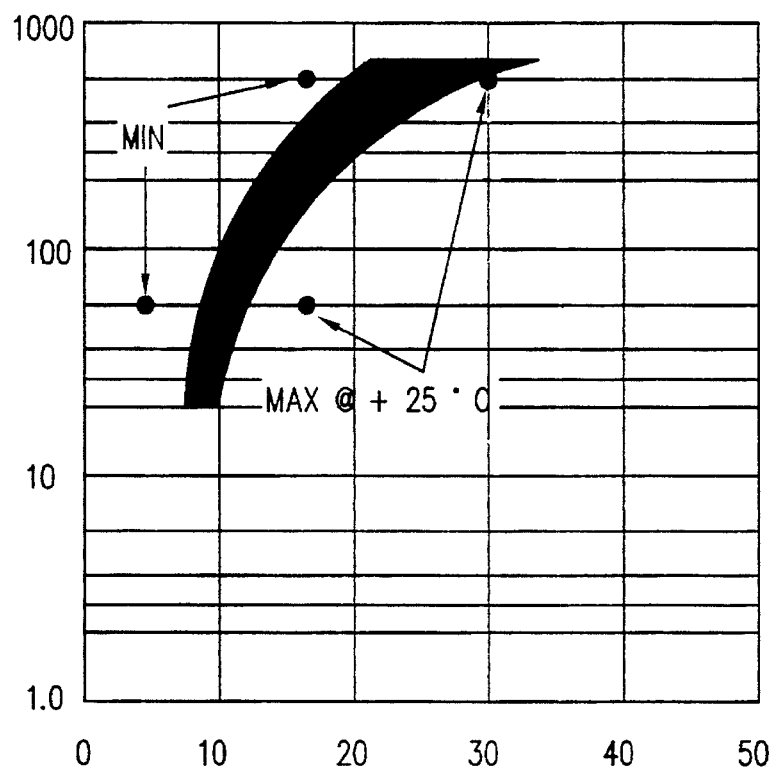
FIG. 6 illustrates a graph of proper times to transition from a high state to a low state as a function of line capacitance.

In one embodiment of the present invention, the detection circuit can comprise a capacitive loading detection circuit for determining a capacitive loading of the individual line. Drive current required is a function of the capacitive loading of a line. Those of skill in the art are familiar with conventional techniques for measuring the capacitance of a bus line. Once the capacitance is known, a proper drive level can be selected. Turning now to FIG. 5, illustrated is a graph of proper times to transition from a low state to a high state as a function of line capacitance. Times are shown along an ordinate of the graph. Capacitance (in picofarads) is shows along the abscissa. The scope of the present invention includes detecting the capacitive loading of the line and adjusting the drive current as a function thereof. FIG. 6 illustrates a graph of proper times to transition from a high state to a low state as a function of line capacitance. The ordinate and abscissa are as in FIG. 5. As is apparent to those of skill in the art, the detection circuit can alternatively comprise an impedance detection circuit for determining an impedance of the individual line. Drive current required is also a function of line impedance.

From the above description, it is apparent that the present invention provides, in a computer system having a computer bus drive circuit capable of providing drive current to an individual line of a computer bus coupled thereto, a circuit for determining a proper level for the drive current and a method of making such determination. The circuit comprises: (1) a detection circuit, coupled to the individual line of the bus, for monitoring a response of the individual line of the bus to changes in state thereof during an operation of the computer system and providing an indication of the response and (2) a drive current establishment circuit, coupled between the detection circuit and the computer bus drive circuit, for establishing the proper level for the drive current in response to the indication produced by the detection circuit during an operation of the computer system.

Although the present invention and its advantages have been described in detail, it should be understood that various changes, substitutions and alterations can be made herein without departing from the spirit and scope of the invention as defined by the appended claims.

What is claimed is:

1. In a computer system having a computer bus drive circuit capable of providing drive current to an individual line of a computer bus coupled thereto, a circuit for determining a proper level for said drive current, comprising:

a detection circuit, coupled to said individual line of said bus, for monitoring a response of said individual line of said bus to changes in state thereof during an operation of said computer system and providing an indication of said response; and a drive current establishment circuit, coupled between said detection circuit and said computer bus drive circuit, for establishing said proper level for said drive current in response to said indication produced by said detection circuit during an operation of said computer system.

2. The circuit as recited in claim 1 wherein said detection circuit comprises a reflection sensing circuit for determining whether said changes in state of said individual line of said bus are of an undesired profile.

3. The circuit as recited in claim 1 wherein said detection circuit comprises a reflection sensing circuit for determining whether said changes in state cause a deviation from an allowed range of voltage values.

4. The circuit as recited in claim 1 wherein said drive current establishment circuit comprises a latching circuit for storing said indication produced by said detection circuit.

5. The circuit as recited in claim 1 wherein said drive current establishment circuit provides an initial level for said drive current when said computer system begins operation.

6. The circuit as recited in claim 1 further comprising a plurality of detection circuits and drive current establishment circuits coupled to selected other individual lines of said bus for individually monitoring and establishing said proper level for said drive current for each of said selected other individual lines.

7. The circuit as recited in claim 1 wherein said drive current establishment circuit is capable of receiving a power-on reset (POR) signal generated when said computer system completes a POR routine to allow said computer bus drive circuit to receive a signal representing said proper level when said computer system completes said POR routine.

8. The circuit as recited in claim 1 wherein said detection circuit comprises a window comparator for detecting reflection on said individual line.

9. The circuit as recited in claim 1 wherein said detection circuit further comprises a capacitive loading detection circuit for determining a capacitive loading of said individual line.

10. The circuit as recited in claim 1 wherein said detection circuit further comprises an impedance detection circuit for determining an impedance of said individual line.

11. In a computer system having a computer bus drive circuit capable of providing drive current to an individual line of a computer bus coupled thereto, a method of determining a proper level for said drive current, comprising the steps of:

monitoring a response of said individual line of said bus to changes in state thereof during an operation of said computer system and providing an indication of said response with a detection circuit coupled to said individual line of said bus; and establishing said proper level for said drive current in response to said indication produced by said detection circuit during an operation of said computer system with a drive current establishment circuit coupled between said detection circuit and said computer bus drive circuit.

12. The method as recited in claim 11 wherein said step of monitoring comprises the step of determining whether said changes in state of said individual line of said bus are of an undesired profile with a reflection sensing circuit.

13. The method as recited in claim 11 wherein said step of monitoring comprises the step of determining whether said changes in state cause a deviation from an allowed range of voltage values with a reflection sensing circuit.

14. The method as recited in claim 11 wherein said step of establishing further comprises the step of storing said indication produced by said detection circuit in a latching circuit.

15. The method as recited in claim 11 further comprising the step of providing an initial level for said drive current when said computer system begins operation with said drive current establishment circuit.

16. The method as recited in claim 11 further comprising the step of individually monitoring and establishing said proper level for said drive current for each of selected other individual lines with a plurality of detection circuits and drive current establishment circuits coupled to selected other individual lines of said bus.

17. The method as recited in claim 11 wherein said step of establishing comprises the step of receiving a power-on reset (POR) signal generated when said computer system completes a POR routine into said drive current establishment circuit to allow said computer bus drive circuit to receive a signal representing said proper level when said computer system completes said POR routine.

18. The method as recited in claim 11 wherein said step of monitoring comprises the step of detecting reflection on said individual line with a window comparator.

19. The method as recited in claim 11 wherein said step of monitoring comprises the step of determining a capacitive loading of said individual line with a capacitive loading detection circuit.

20. The method as recited in claim 11 wherein said step of monitoring comprises the step of determining an impedance of said individual line with an impedance detection circuit.

21. In a computer system having a computer bus drive circuit capable of providing drive current to individual lines of a computer bus coupled thereto, a circuit for determining a proper level for said drive current, comprising:

a reflection sensing circuit, coupled to selected individual lines of said bus, for monitoring changes in state of said selected individual lines during an operation of said computer system, determining whether said changes in state of said selected individual lines are of an undesired profile and providing an indication when said changes in state are of said undesired profile; and a drive current establishment circuit, coupled between said detection circuit and said computer bus drive circuit, for establishing proper levels for said drive current in response to said indication produced by said detection circuit during an operation of said computer system.

22. The circuit as recited in claim 21 wherein said reflection sensing circuit determines whether said changes in state cause a deviation from an allowed range of voltage values.

23. The circuit as recited in claim 21 wherein said drive current establishment circuit comprises a latching circuit for storing said indication produced by said detection circuit.

24. The circuit as recited in claim 21 wherein said drive current establishment circuit provides an initial level for said drive current when said computer system begins operation.

25. The circuit as recited in claim 21 wherein said drive current establishment circuit is capable of receiving a power-on reset (POR) signal generated when said computer system completes a POR routine to allow said computer bus drive circuit to receive a signal representing said proper level when said computer system completes said POR routine.

26. The circuit as recited in claim 21 wherein said detection circuit comprises a window comparator for detecting reflection on said individual lines.

27. The circuit as recited in claim 21 wherein said detection circuit further comprises a capacitive loading detection circuit for determining a capacitive loading of said individual line.

28. The circuit as recited in claim 21 wherein said detection circuit further comprises an impedance detection circuit for determining an impedance of said individual line.

29. The circuit as recited in claim 21 wherein said computer bus drive circuit is capable of providing a different level of drive current to each of said individual lines of said bus.

30. The circuit as recited in claim 21 wherein said computer system is a personal computer (PC).

31. In a computer system having a computer bus drive circuit capable of providing drive current to individual lines of a computer bus coupled thereto, a method of determining a proper level for said drive current, comprising the steps of:

monitoring changes in state of said selected individual lines during an operation of said computer system with a reflection sensing circuit coupled to selected individual lines of said bus, said reflection sensing circuit determining whether said changes in state of said selected individual lines are of an undesired profile and providing an indication of said response when said changes in state are of said undesired profile; and establishing proper levels for said drive current in response to said indication produced by said detection circuit during an operation of said computer system with a drive current establishment circuit coupled between said detection circuit and said computer bus drive circuit.

32. The method as recited in claim 31 wherein said step of monitoring comprises the step of determining whether said changes in state cause a deviation from an allowed range of voltage values with a reflection sensing circuit.

33. The method as recited in claim 31 wherein said step of establishing further comprises the step of storing said indication produced by said detection circuit in a latching circuit.

34. The method as recited in claim 31 further comprising the step of providing an initial level for said drive current when said computer system begins operation with said drive current establishment circuit.

35. The method as recited in claim 31 wherein said step of establishing comprises the step of receiving a power-on reset (POR) signal generated when said computer system completes a POR routine into said drive current establishment circuit to allow said computer bus drive circuit to receive a signal representing said proper level when said computer system completes said POR routine.

36. The method as recited in claim 31 wherein said step of monitoring comprises the step of detecting reflection on said selected individual lines with a window comparator.

37. The method as recited in claim 31 wherein said step of monitoring comprises the step of determining a capacitive loading of said selected individual lines with a capacitive loading detection circuit.

38. The method as recited in claim 31 wherein said step of monitoring comprises the step of determining an impedance of said selected individual lines with an impedance detection circuit.

39. The method as recited in claim 31 further comprising the step of providing a different level of drive current to each of said selected individual lines of said bus with said computer bus drive circuit.

40. The method as recited in claim 31 wherein said computer system is a personal computer (PC).

41. In a personal computer (PC) having a computer bus drive circuit capable of providing a different level of drive current to each of individual lines of a computer bus coupled thereto, a circuit for determining a proper level for said drive current, comprising:

a reflection sensing circuit, coupled to selected ones of said individual lines of said bus, for monitoring changes in state of said selected individual lines during an operation of said PC, determining whether said changes in state of said selected individual lines cause an excess voltage oscillation in said individual lines and providing an indication when said voltage oscillation is excessive; and a drive current establishment circuit, coupled between said detection circuit and said computer bus drive circuit, for establishing proper levels for said drive current in response to said indication produced by said detection circuit during an operation of said PC, said drive current establishment circuit comprising a latching circuit for storing said indication produced by said detection circuit, said drive current establishment circuit providing an initial level for said drive current when said PC begins operation.

42. The circuit as recited in claim 41 wherein said drive current establishment circuit is capable of receiving a power-on reset (POR) signal generated when said PC completes a POR routine to allow said computer bus drive circuit to receive a signal representing said proper level when said PC completes said POR routine.

43. The circuit as recited in claim 41 wherein said detection circuit comprises a window comparator for detecting reflection on said selected individual lines.

44. The circuit as recited in claim 41 wherein said detection circuit further comprises a capacitive loading detection circuit for determining a capacitive loading of said selected individual lines.

45. The circuit as recited in claim 41 wherein said detection circuit further comprises an impedance detection circuit for determining an impedance of said selected individual lines.

46. In a personal computer (PC) having a computer bus drive circuit capable of providing a different level of drive current to each of individual lines of a computer bus coupled thereto, a method of determining a proper level for said drive current, comprising the steps of:

monitoring changes in state of selected ones of said individual lines of said bus during an operation of said PC with a reflection sensing circuit coupled to said selected individual lines, said reflection sensing circuit determining whether said changes in state of said selected individual lines cause an excess voltage oscillation in said individual lines and providing an indication when said voltage oscillation is excessive; and establishing proper levels for said drive current in response to said indication produced by said detection circuit during an operation of said PC with a drive current establishment circuit coupled between said detection circuit and said computer bus drive circuit, said drive current establishment circuit comprising a latching circuit for storing said indication produced by said detection circuit, said drive current establishment circuit providing an initial level for said drive current when said PC begins operation.

47. The method as recited in claim 46 wherein said step of establishing comprises the step of receiving a power-on reset (POR) signal generated when said computer system completes a POR routine into said drive current establishment circuit to allow said computer bus drive circuit to receive a signal representing said proper level when said computer system completes said POR routine.

48. The method as recited in claim 46 wherein said step of monitoring comprises the step of detecting reflection on said selected individual lines with a window comparator.

49. The method as recited in claim 46 wherein said step of monitoring comprises the step of determining a capacitive loading of said selected individual lines with a capacitive loading detection circuit.

50. The method as recited in claim 46 wherein said step of monitoring comprises the step of determining an impedance of said selected individual lines with an impedance detection circuit.

* * * * *